United States Patent [19]

Brenner et al.

[11] Patent Number: 5,786,983
[45] Date of Patent: Jul. 28, 1998

[54] INFORMATION DEVICE WITH DISPLAY AND KEYBOARD HAVING CORRESPONDING SETS OF FUNCTION KEYS

[75] Inventors: Richard K. Brenner, Fanwood, N.J.; Mark S. Kimbrough, Austin, Tex.; Philip Leung, Heaton, England; Robert Garrett; Pearce Jones, both of Austin, Tex.

[73] Assignee: Brother International Corporation, Somerset, N.J.

[21] Appl. No.: 585,734

[22] Filed: Jan. 16, 1996

[51] Int. Cl.[6] .................................. G06F 1/16; H05K 5/02
[52] U.S. Cl. .......................... 361/680; 361/683; 345/169; 364/709.12
[58] Field of Search .................................. 361/680–683, 361/686; 345/156, 157, 168, 169, 173; 364/708.1, 709.01, 709.12, 709.02; 248/917–918

[56] References Cited

U.S. PATENT DOCUMENTS

| | | | |
|---|---|---|---|
| 4,291,198 | 9/1981 | Anderson et al. | 179/2 DP |
| 4,497,036 | 1/1985 | Dunn | 361/680 |
| 4,946,121 | 8/1990 | Troke. | |
| 5,181,029 | 1/1993 | Kim | 341/22 |
| 5,202,817 | 4/1993 | Koenck et al. | 361/680 |
| 5,543,897 | 8/1996 | Altrieth, III | 355/209 |
| 5,559,531 | 9/1996 | Schiffer | 345/168 |
| 5,565,889 | 10/1996 | Crooks et al. | 345/157 |

FOREIGN PATENT DOCUMENTS

| | | |
|---|---|---|
| 2-148315 | 6/1990 | Japan. |
| 6-149414 | 5/1994 | Japan. |

*Primary Examiner*—Lynn D. Feild
*Attorney, Agent, or Firm*—Oliff & Berridge

[57] ABSTRACT

An information device including a display portion in which a display screen is positionable and a removable keyboard with a first set of function keys. The information device can selectively assign different functions to each of the function keys. The display screen includes a second set of function keys. The functions assigned to the second set of function keys correspond to the functions of the first set of function keys. Both sets of function keys correspond in size, shape or number to allow the user to determine which function key is desired from either location.

13 Claims, 21 Drawing Sheets

INFORMATION DEVICE WITH DISPLAY AND KEYBOARD HAVING CORRESPONDING SETS OF FUNCTION KEYS

BACKGROUND OF THE INVENTION

1. Field of the Invention

The present invention relates to a computer, and in particular, to a computer having a rear keyboard storage portion configured to receive a keyboard of the computer.

2. Related Applications

This invention is related to the inventions described in and claimed in pending U.S. Patent Applications (Attorney Docket Nos. JAO 30911, JAO 30912, JAO 30913, JAO 30915, JAO 30916, JAO 30917 and JAO 30918), filed on the same day as this application, which are hereby incorporated by reference.

3. Description of Related Art

Several approaches are known for storing or holding a keyboard such that a work space in front of a computer display screen remains unoccupied and the keyboard is protected from environmental conditions. In particular, Japanese Laid Open Patent Application No. 2-148315 discloses a personal computer system in which a keyboard can be folded in half and stored in a pocket within a computer cabinet. The pocket opens onto the front face of the computer cabinet. As a result, the computer and keyboard can be carried easily when the keyboard is stored in the pocket.

Japanese Laid Open Patent Application No. 4-299663 discloses an information processor having a slot that opens outward on a front surface adjacent a display screen. The upper and lower portions of the slot are dimensioned to engage the front and rear sides of the keyboard, respectively, such that the keys face outward. The length of the slot is at least as long as the length of the keyboard. Because the keys remain exposed while the keyboard is stored in the slot, simple input operations can be performed.

U.S. Pat. No. 4,946,121 to Troke discloses a computer keyboard holder that includes a pair of brackets mounted to opposite side surfaces of a computer display terminal. The brackets project upwardly above the top surface of the computer display terminal. Thus, keyboard receiving portions of the bracket are exposed. When desired, the keyboard can be stored in a storage position above the display screen portion within the keyboard receiving portions of the brackets.

None of the prior art references, however, appreciates the need to protect the keyboard from adverse environmental conditions without detracting from a streamlined external appearance of the computer. The prior art devices all require increasing the front profile of the computer (i.e. by increasing the width of the computer to include a pocket or slot or increasing the height of the computer with brackets). In addition, when the width of the computer increases, the footprint of the computer also increases and therefore occupies a greater part of the available work space.

SUMMARY OF THE INVENTION

This invention provides a computer having a keyboard storage portion that overcomes the problems of the prior art devices. According to one preferred embodiment, the computer has a rear keyboard storage portion. The computer includes a housing having a display screen portion in which a display screen is positionable and the rear keyboard storage portion. The rear keyboard storage portion is positioned behind the display screen portion and is shaped to at least partially receive a keyboard for the computer. When the keyboard is in a keyboard storage position within the keyboard storage portion, the keyboard remains concealed when the computer is viewed from the front (i.e., when viewing the display screen).

Preferably, at least part of the rear keyboard storage portion is formed as a single piece with the housing. The rear keyboard storage portion preferably includes first and second intersecting surfaces forming a corner for receiving corresponding first and second sides of the keyboard, respectively. Preferably, the first surface extends at an angle with respect to a vertical axis, and the second surface extends at an angle with respect to a horizontal axis.

The housing preferably includes a third surface opposite the first surface and intersecting the second surface. The first, second and third surfaces define a slot having a lateral dimension (i.e., width) defined by a distance between the first and third surfaces. Preferably, the lateral dimension of the slot is greater than a height (i.e., dimension of the second side) of the keyboard. A longitudinal dimension of the first and second surfaces is preferably less than a longitudinal dimension of the keyboard. Preferably, a top of the slot opposite the second surface and least one longitudinal end of the slot are open. In a preferred embodiment, the first and third surfaces are approximately perpendicular to the second surface, and the first surface and the third surface are approximately parallel. The first surface preferably includes at least one web extending to the second surface. A distance between an outer periphery of the web and the third surface is approximately equal to the dimension of the second side of the keyboard.

The third surface of the housing preferably includes a projection engageable with a groove in a side of the keyboard. Preferably, the projection extends in a transverse direction of the slot approximately perpendicular to a longitudinal direction of the slot. In one preferred embodiment, the first surface of the housing is a rear surface of the display screen portion. The first surface preferably extends further in the transverse and longitudinal directions than the second surface.

In another preferred embodiment, an information device preferably includes a display screen portion in which a display screen is positionable and a removable keyboard with a first set of keys. The information device can selectively or variably assign different functions to each of the keys based on a current program status of a program operating on the information device. The display screen portion includes a second set of keys. The functions assigned to the second set of keys correspond to the variably assigned functions of the first set of keys. Preferably, the number of keys in the second set corresponds to the number of keys in the first set.

In a preferred embodiment, shapes of keys in the second set correspond to shapes of keys in the first set. Preferably, the keys in the first and second sets have a substantially identical shape.

Preferably, at least two adjacent keys of the second set are separated by a second distance substantially equal to a first distance separating respective keys of the first set. Adjacent keys of the first and second sets are preferably separated from each other by substantially the same distance. Preferably, the keys of the first and second sets have a substantially identical size.

In a preferred embodiment, the keys of the first and second sets are arranged in substantially horizontal arrays. In a preferred embodiment, the display screen is positionable within an area defining a display screen frame, and the second set of keys is positioned in a substantially horizontal array adjacent to the display screen frame. Preferably, the second set is positioned below the display screen frame.

In a preferred embodiment, the functions performed by the keys of the first and second sets change during execution of a program by the information device.

These and other features and advantages of this invention are described in or apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
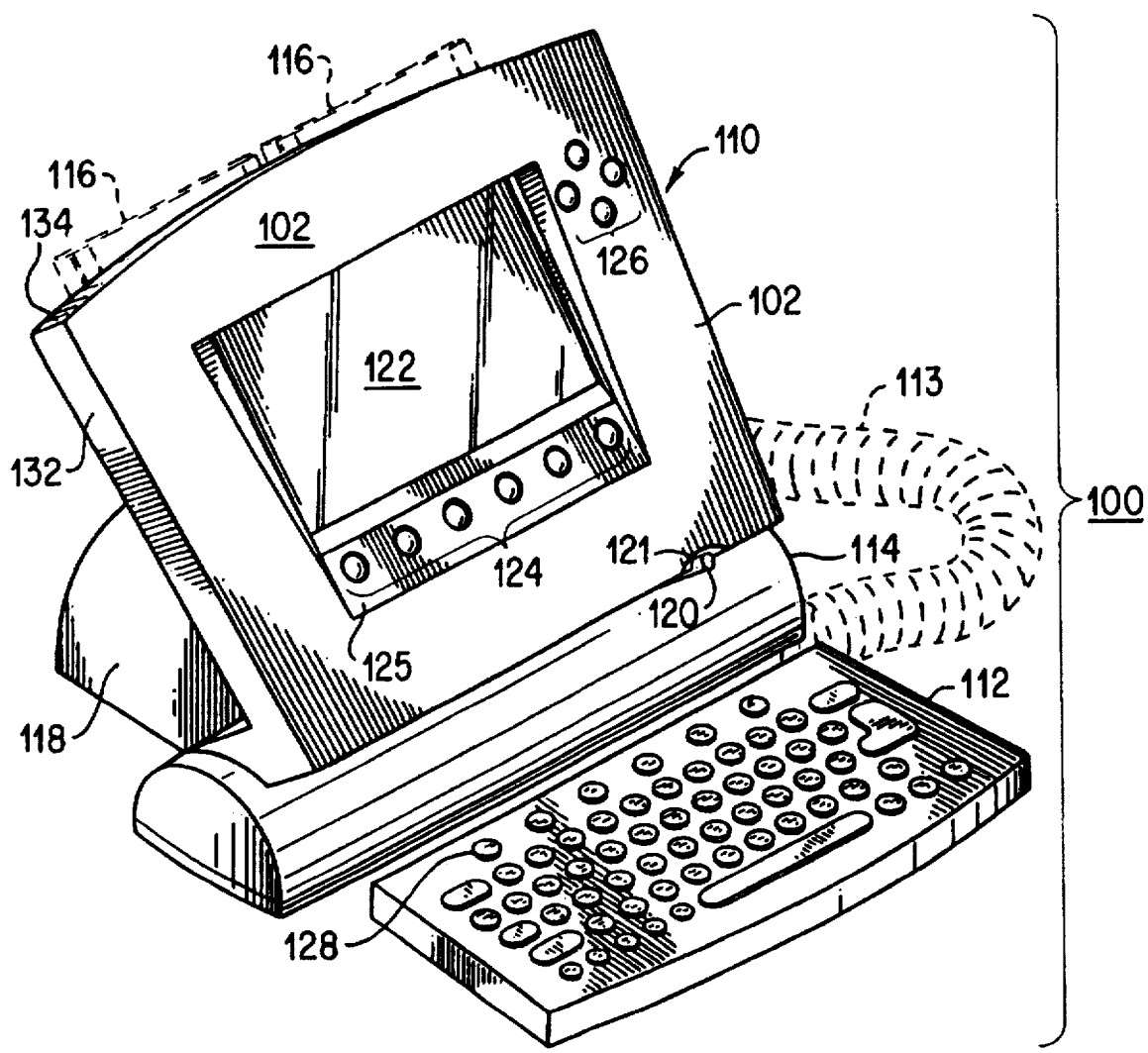
FIG. 1 is a front perspective view of the computer with a keyboard in an operating position showing two IC data cards installed in ports on a top surface of the computer.
Figure 27:
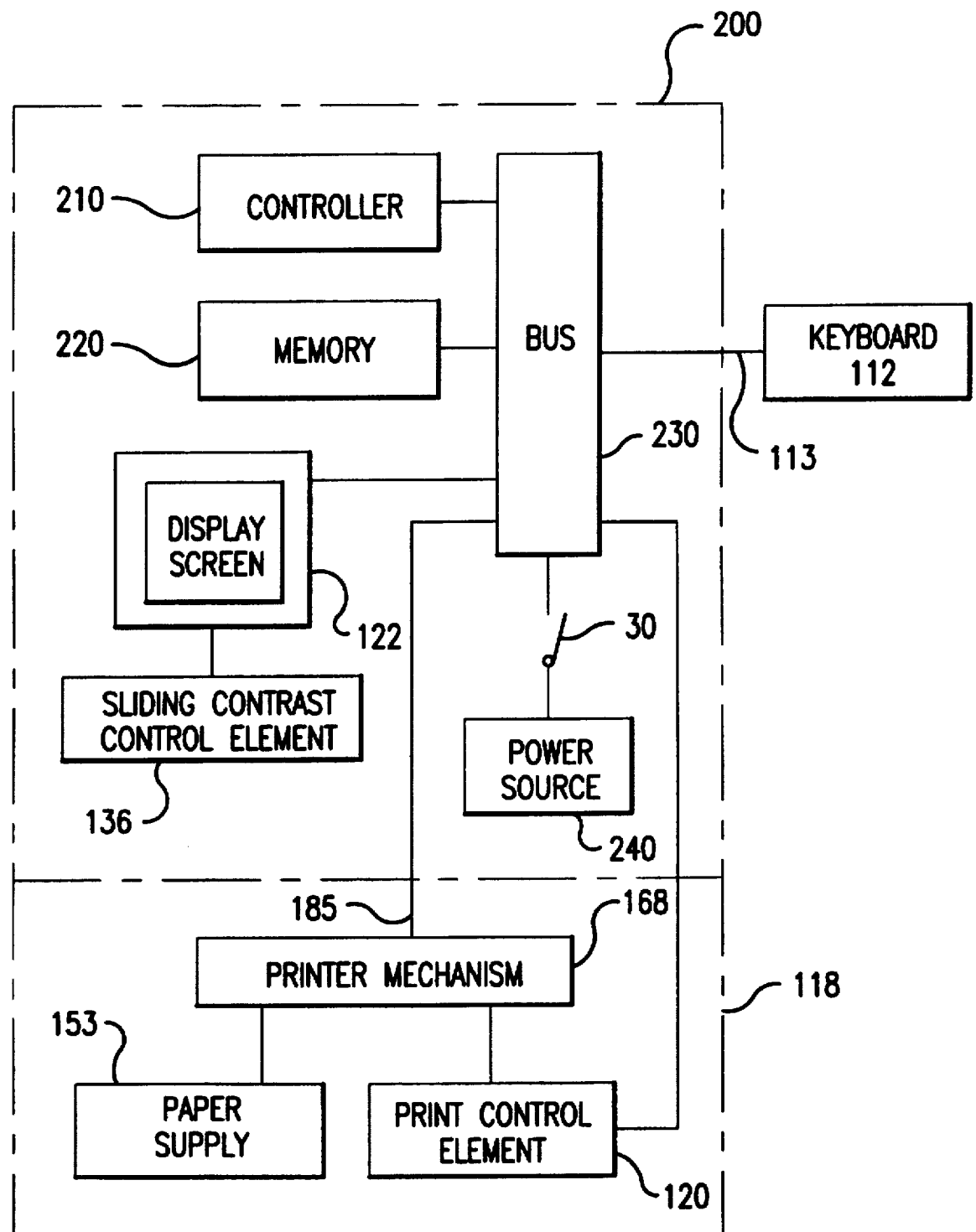
FIG. 27 is a block diagram of the electrical components of the computer, keyboard and printer.

FIGS. 1–7 illustrate a computer 100, having a housing 110, a keyboard 112 and an attached printer 118. As shown in block diagram form in FIG. 27, the control system 200 of the computer 100 includes a controller 210, a memory 220 and a bus 230 interconnecting the controller 210 and the memory 230. The bus 230 of the computer 100 is connected to an AC or a DC power source 240 that supplies power to the control system 200 when a power switch 130 is in an "ON" position. As shown in FIG. 1, the keyboard 112 is connected to the housing 110 of the computer 100 by a flexible keyboard connecting cord 113. As shown in FIG. 27, the connecting cord 113, electrically connects the keyboard 112 to the bus 230. For clarity, the keyboard connecting cord 113 is not shown in the other figures.

As shown in FIG. 27, the controller 210 is preferably implemented on a programmed microprocessor or microcontroller and peripheral integrated circuit elements. However, the microcontroller 210 can also be implemented on an ASIC or other integrated circuit, a hardwired electronic or logic circuit such as a discrete element circuit, a programmable logic device such as a PLD, PLA or PAL, or the like.

Figure 2:
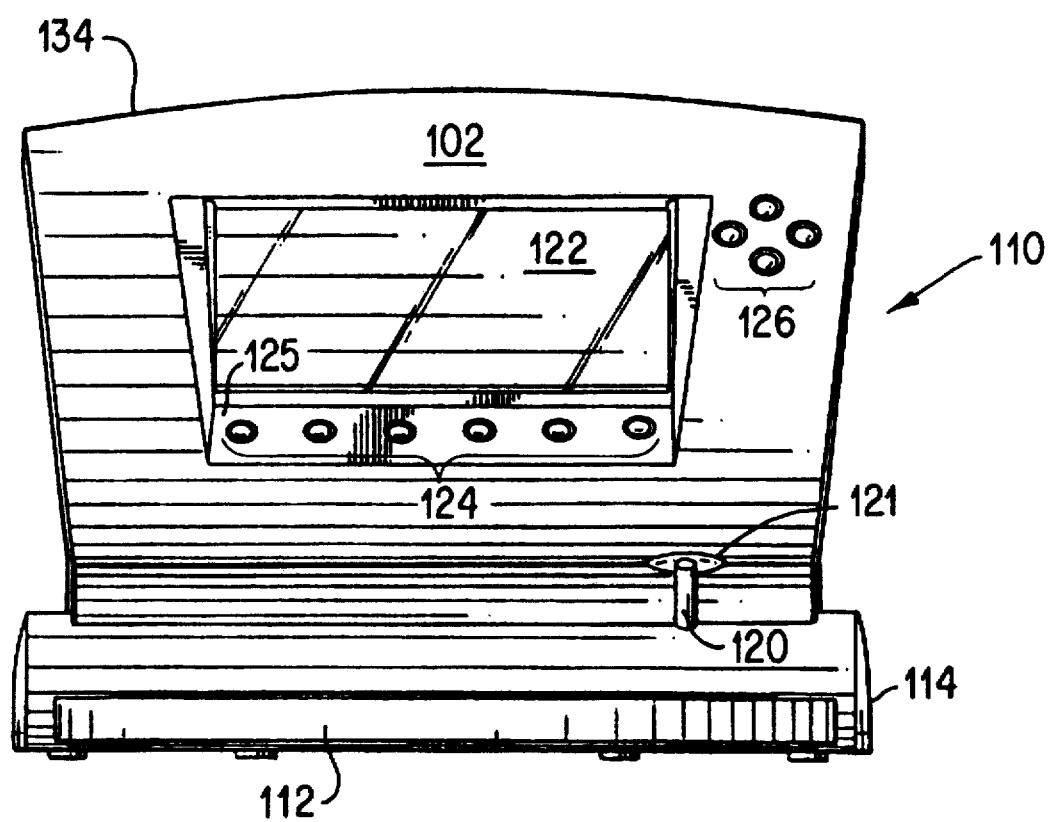
FIG. 2 is a front view of the computer and keyboard of FIG. 1.
Figure 3:
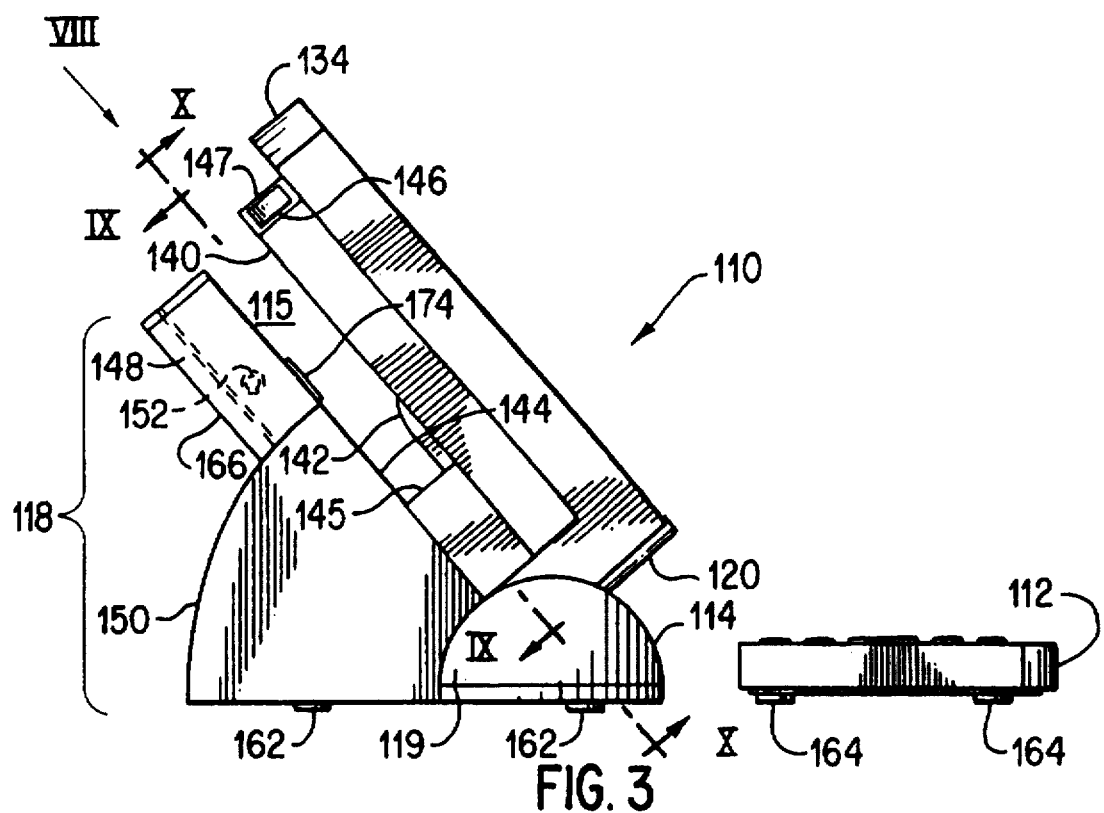
FIG. 3 is a left side view of the computer and keyboard of FIG. 1.
Figure 4:
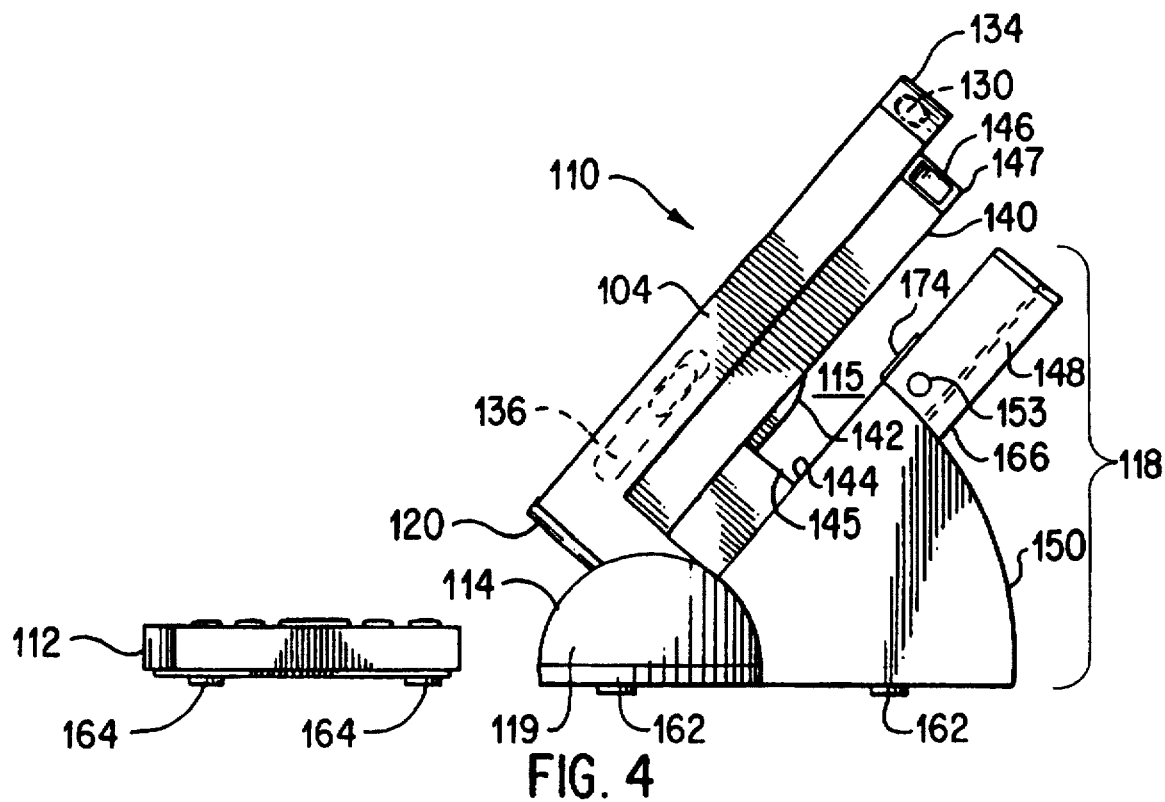
FIG. 4 is a right side view of the computer and keyboard of FIG. 1.

The computer 100 includes a display screen 122 disposed on a front surface 102 of a display screen portion 132. The display screen 122 is preferably a liquid crystal display, although other types of display screens can be used. As shown in FIG. 4, the display screen 122 can be adjusted using a display screen contrast control element 136 disposed on a left side surface 104 of the display screen portion 132. The display screen portion 132 projects rearwardly from a base 114 at a predetermined angle so that the display screen is visible to and optimally positioned for a seated or standing user. Alternatively, the display screen portion 132 can be attached to the base 114 by a hinge (not shown) to allow the angular position of the display screen portion 132 to be adjusted for easy viewing of the display screen 122. A width of the base 114, as shown in FIG. 2, is slightly greater than the width of the display screen portion 132. The sides 119 of the base 114, as shown in FIGS. 3 and 4, have an approximately semicircular shape.

The display screen portion 132 includes display screen cursor movement keys 126. Preferably, as shown in FIG. 1, there are four screen cursor movement keys. The display screen cursor movement keys 126 are positioned adjacent to an upper right corner of the display screen 122 and are placed in a diamond-shaped pattern. Each of the display screen cursor movement keys 126 moves the cursor in a direction corresponding to the position of the key within the diamond-shaped pattern. Therefore, the upper display screen cursor movement key moves the cursor upward, the right display screen cursor movement key moves the cursor to the right, the lower display screen cursor movement key moves the cursor downward and the left display screen cursor movement key moves the cursor to the left. Of course, other devices for moving the display screen cursor can be used. These other devices include a mouse-type track ball. The display screen portion 132 includes a display screen panel 125 within which multiple display screen function keys 124 are disposed. In a preferred embodiment, the display screen function keys 124 are evenly spaced in a horizontal array. In the preferred embodiment, the program executed by the control system 200 assigns different functions to the display screen function keys 124 depending upon the portion of the program currently being executed.

The keyboard 112 includes a corresponding array of keyboard function keys 128 having the same functions as the display screen function keys 124. The display screen function keys 124 and the keyboard function keys 128 are preferably the same in number, size, color, feel, spacing, etc. Thus, a user can easily determine which function key is desired from either array, whether both the keyboard function keys 128 and the display screen function keys 124 or only the display screen function keys 124 are accessible and/or visible to the user.

As described above, the function assigned to each of the display screen function keys 124 and each of the corresponding keyboard function keys 128 changes during execution of the program by the control system 200. The current function assigned to each function key is preferably displayed on the display screen 122 directly above each one of the corresponding display screen function keys 124. Alternatively, both the display screen function keys 124 and the keyboard function keys 128 can be dedicated to serve the same functions at all times. In other aspects, the keyboard 112 is similar to those known in the art. If the keyboard 112 is intended for use with a computer for processing information relating to food preparation, the keyboard preferably includes dedicated keys for specifying and/or converting between various units of measure (not shown).

Figure 7:
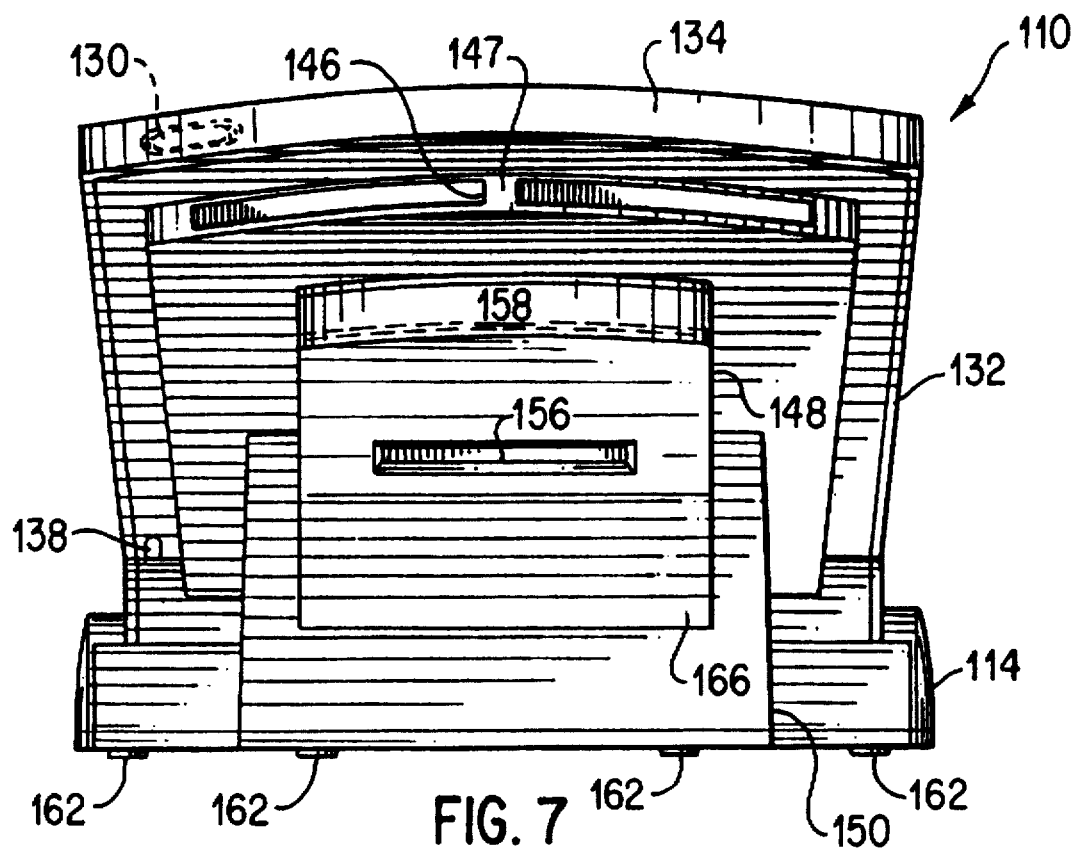
FIG. 7 is a rear view of the computer of FIG. 1.
Figure 8:
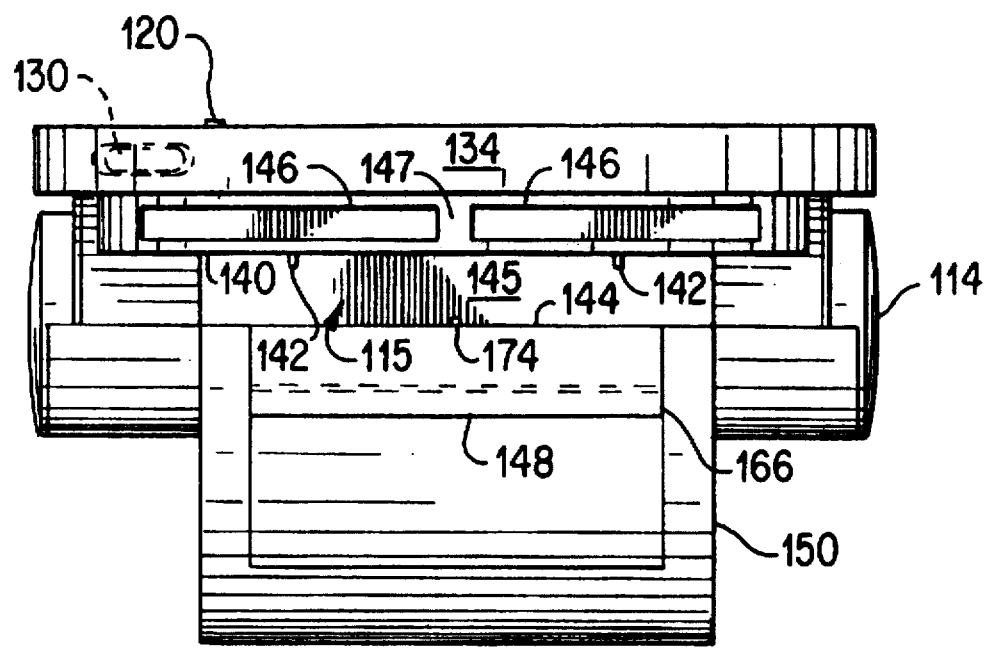
FIG. 8 is a view of the computer of FIG. 1 along a line 8—8 shown in FIG. 3.
Figure 17:
FIG. 17 is a rear view of the keyboard.

As shown in FIG. 7, one end of the keyboard connecting cord 113 is removably connected to the housing 102 of the computer 100 at a keyboard connecting cord port 138 on a rear surface 140 of the display screen portion. Preferably, the keyboard connecting cord port 138 is a modular jack-type connector. Similarly, FIG. 17 shows a rear surface of the keyboard 112 with a corresponding keyboard connecting cord port 138 into which the other end of the keyboard connecting cord 113 is inserted. In addition to or as a substitute for the keyboard 112, any other equivalent input device may be operatively linked to the housing 102. In addition, any other type of connection can be used, such as a hard-wire or infrared connection.

Figure 5:
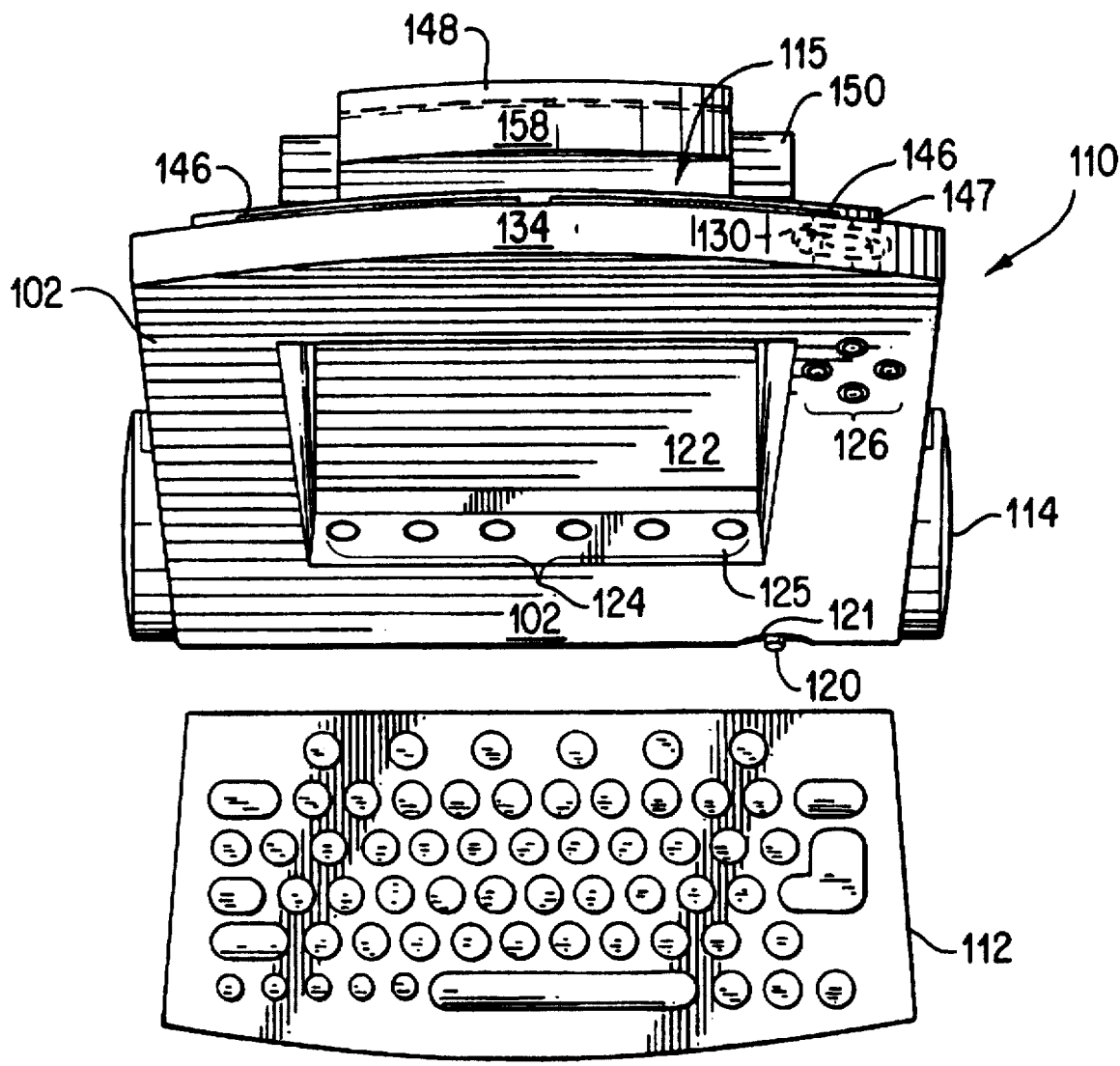
FIG. 5 is a top view of the computer and keyboard of FIG. 1.

As shown in FIGS. 2 and 5, a width of the keyboard 112 is slightly less than a width of the display screen 122. Further, a front surface of the keyboard 112 is slightly curved. The side and back surfaces of the keyboard 112 are flat, such that the keyboard 112 has a fan shape when viewed from above as shown in FIGS. 1 and 5. Similarly, a top surface 134 of the display screen portion 132 is slightly curved. The side surfaces 104 and the bottom surface of the display screen portion 132 are flat. The side surfaces 104 slope away from each other toward the display screen top surface 134. As a result, the display screen portion also has the fan shape.

A lower edge of the display screen portion 132 includes a grooved relief 121. A print control button 120 is positioned within the grooved relief 121. As shown in FIG. 27, the print control button 120 is electrically connected to the controller 210 of the control system 200. The print control button 120 includes a cylindrical body portion that projects upwardly and slightly beyond the grooved relief 121. As explained below in greater detail, when a user presses the print control button 120, the controller 210 outputs the file that is currently being displayed on the display screen 122 to the printer 118 and the printer 118 prints the file. As an alternative to the push-button configuration, the print control button 120 can be configured to operate as any other simple and easily operated control element. For example, the print control button 120 could be a solid state button, a mechanical button, a pressure sensitive switch, or any other switch.

In a preferred embodiment, pressing the print control button 120 generates a "print file" interrupt within the controller 210. In response, the controller 210 outputs the entire file, of which only a single screen is displayed at any one time, to the printer 118. Therefore, multiple keystrokes and/or repetitive operations can be eliminated. As a result, a user can actuate the print control button 120 by pressing it once in a single operation instead of alternatingly pressing print screen and page down keys or accessing the print sequence of the program by stepping through a number of menu branches.

Figure 6:
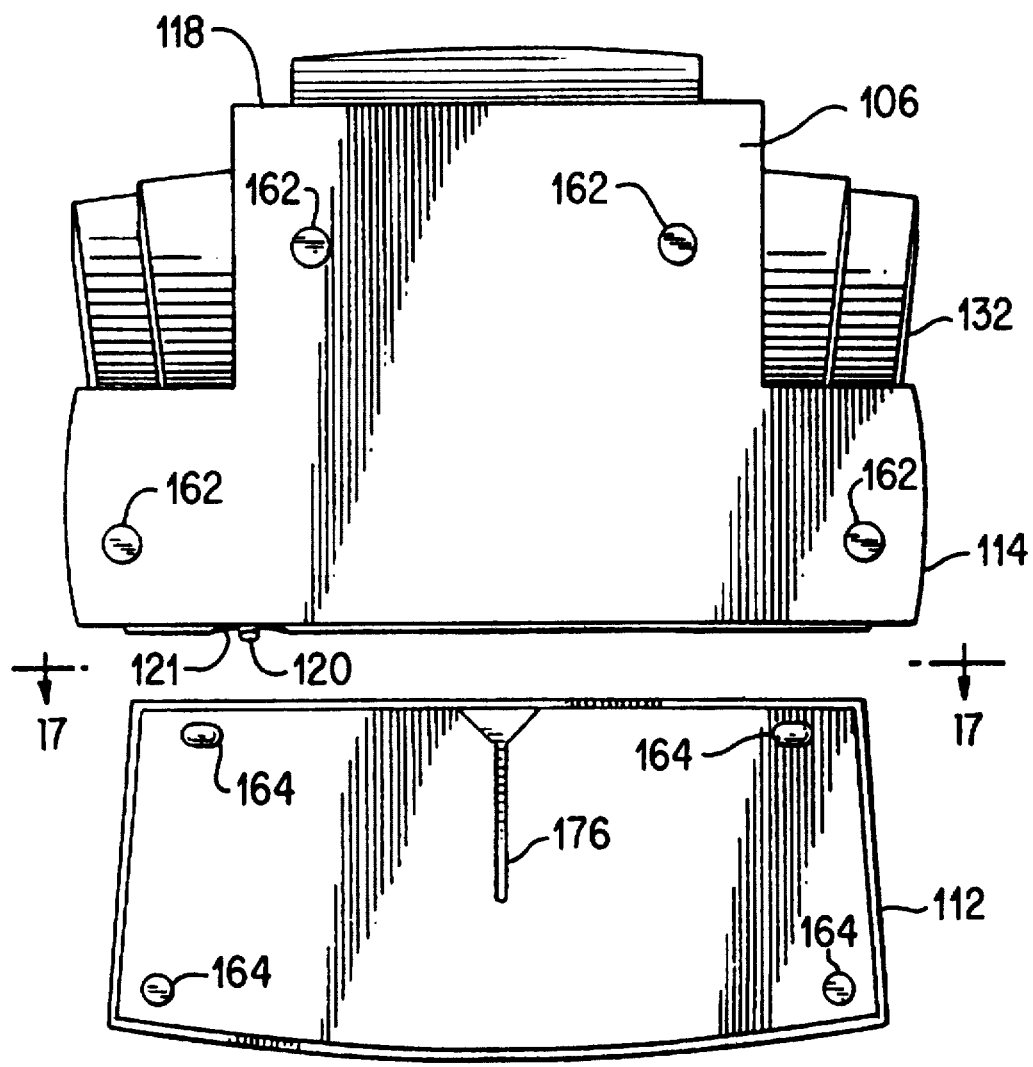
FIG. 6 is a bottom view of the computer and keyboard of FIG. 1.
Figure 18:
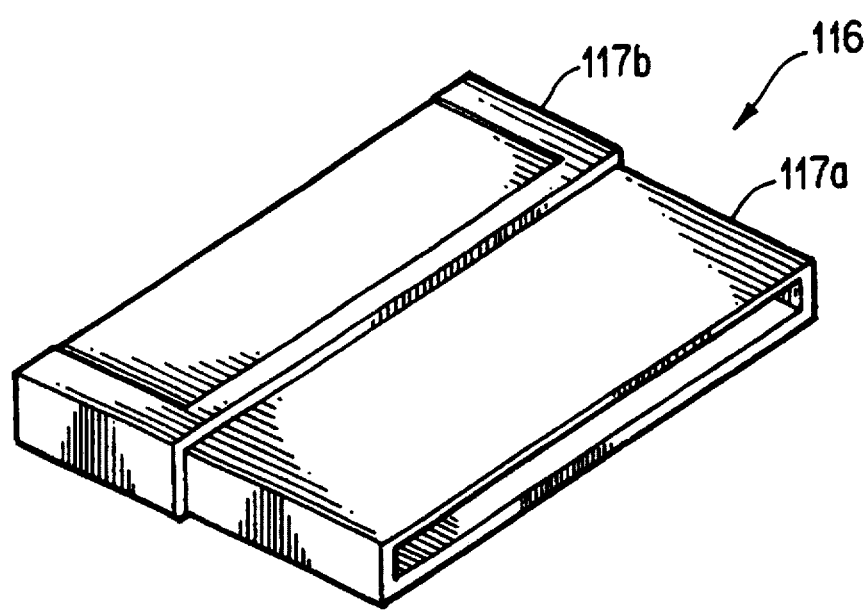
FIG. 18 is a front perspective view of the data storage element.

The computer 100 includes at least two removable data storage elements 116. The data storage elements 116 are preferably integrated circuit (IC) cards, but other media such as disks, diskettes, tape cassettes, etc. can be used. The data storage elements 116 are inserted into data storage element port 146, as shown in FIGS. 3, 4 and 6. Preferably the data element storage ports 146 are positioned in an intermediate upper surface 147 of the housing 102. As shown in FIG. 18, the data storage elements 116 preferably include insertion portions 117a and enlarged portions 117b. The data storage element ports 146 are dimensioned to receive the insertion portions 117a. Therefore, the enlarged portions 117b project outwardly from the data storage element ports 146 when the data storage elements 116 are fully inserted.

As shown in FIGS. 3, 4 and 7, the printer 118 includes a lower printer portion 150 and an upper printer portion 148. The upper printer portion 148, as explained in greater detail below, is pivotably connected to the lower printer portion 150. A printer top surface 158 of the upper printer portion 148 is slightly curved, similar to the display screen portion top surface 134. As shown in FIGS. 3 and 4, the lower printer portion 150 also has the fan shape when viewed from the side.

Figure 19:
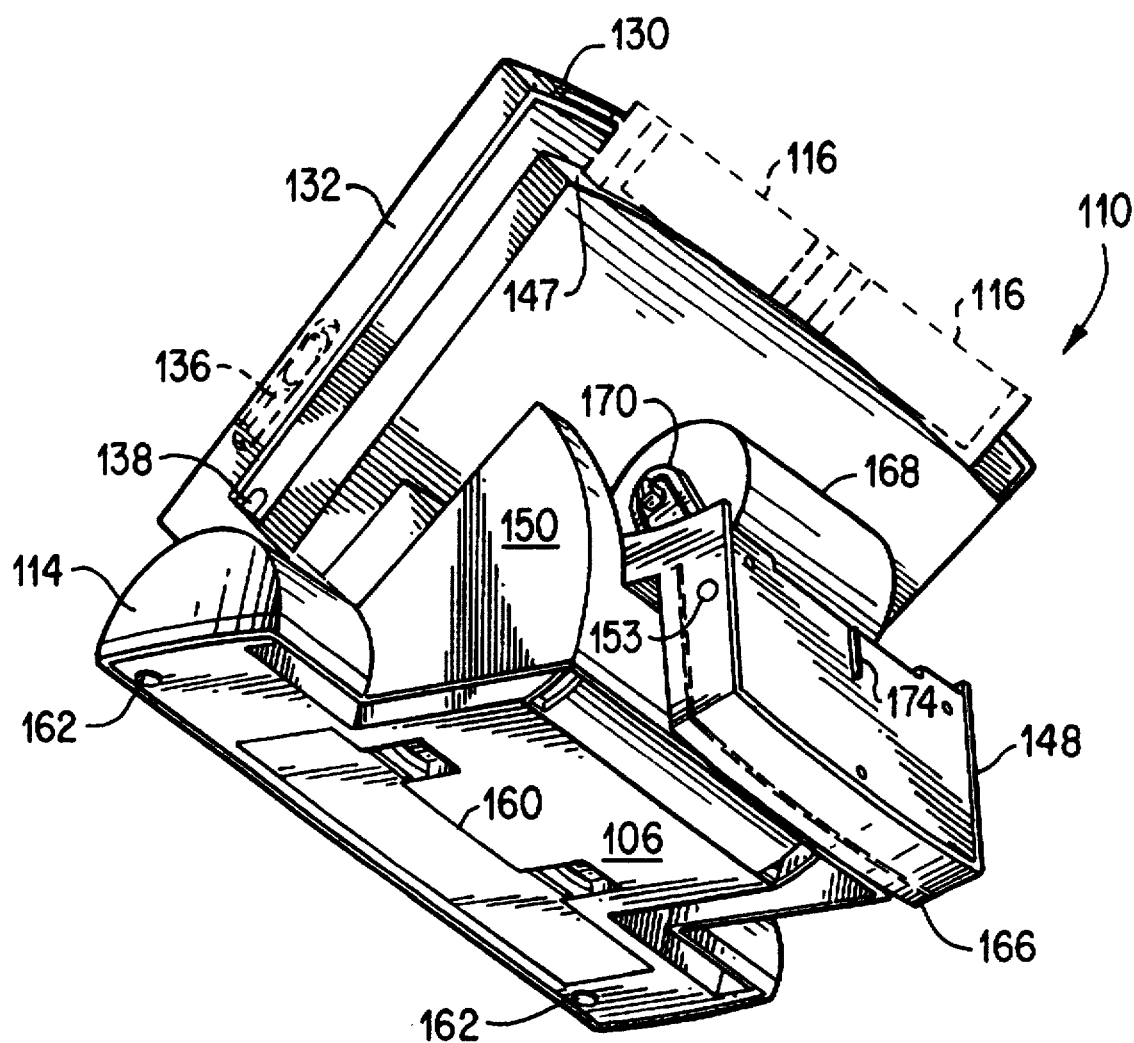
FIG. 19 is a rear perspective view of the computer showing the printer in a lowered position.
Figure 20:
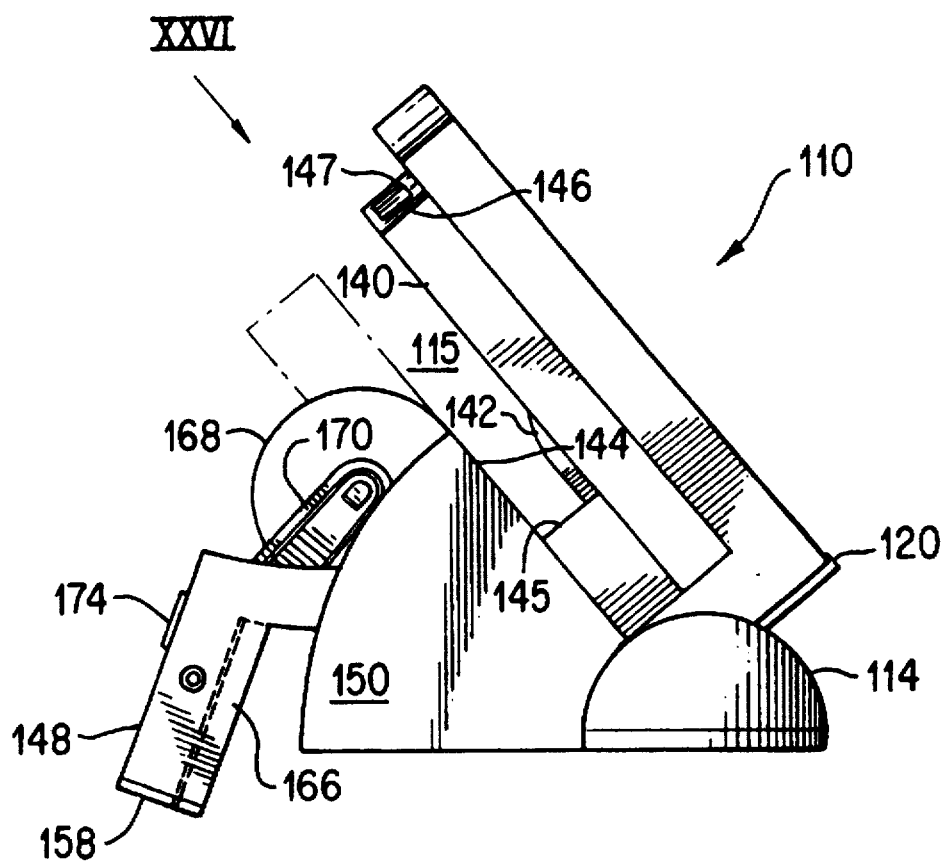
FIG. 20 is a left side view of the computer of the computer of FIG. 19 showing the pivot path of the printer between a raised operating position (shown in phantom) and a lowered loading/unloading position.
Figure 21:
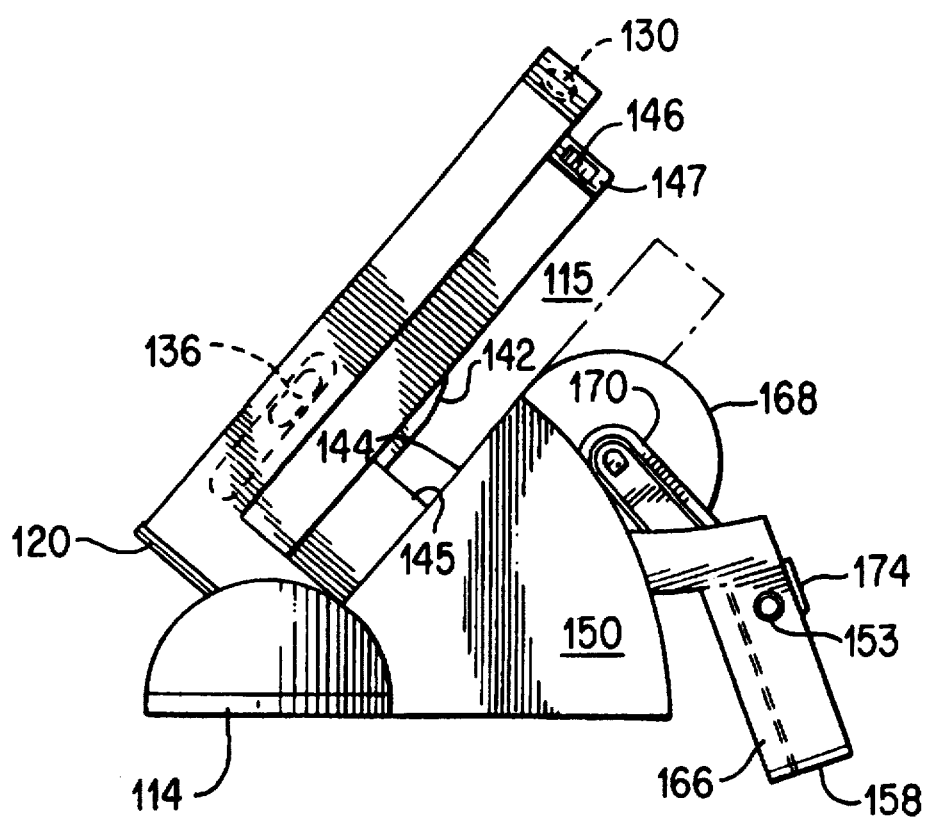
FIG. 21 is a right side view of the computer of FIG. 19.
Figure 23:
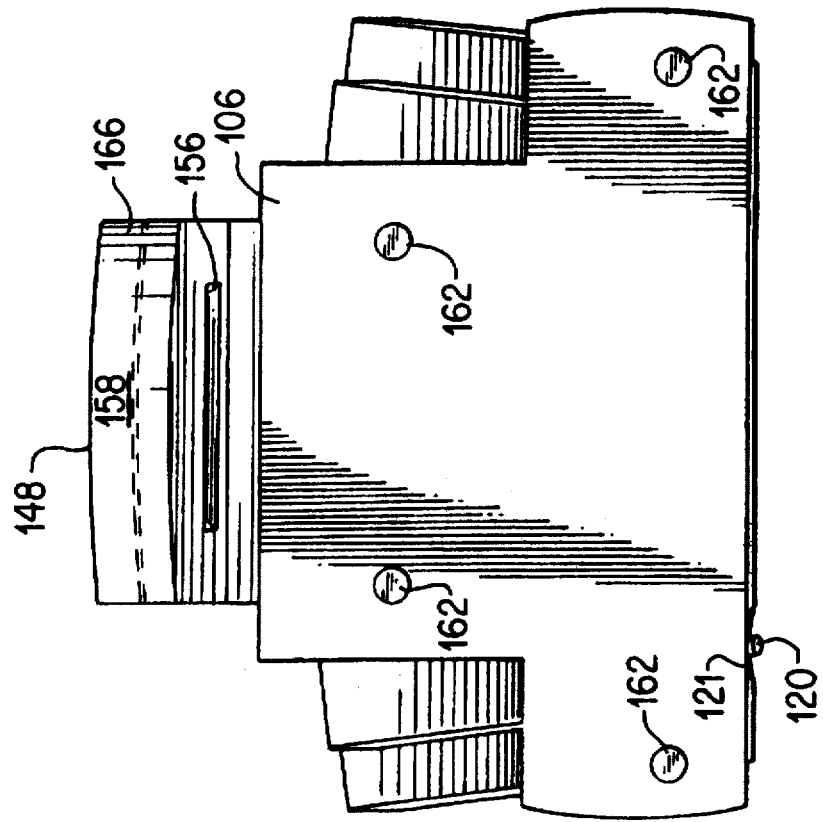
FIG. 23 is a bottom view of the computer of FIG. 19.
Figure 22:
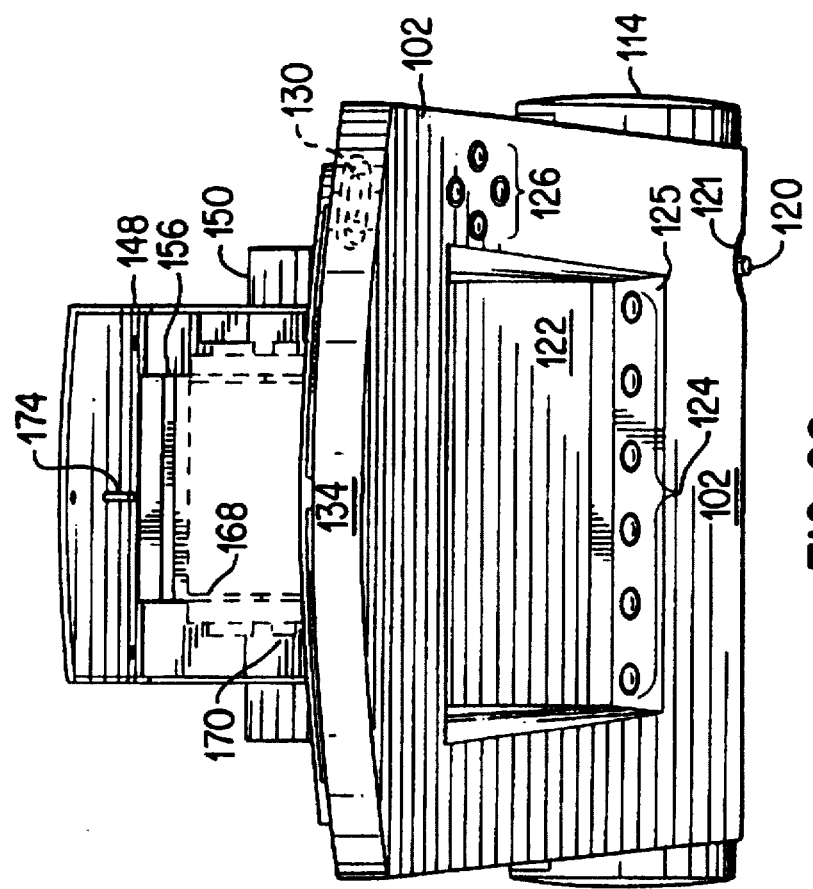
FIG. 22 is a top view of the computer of FIG. 19.
Figure 24:
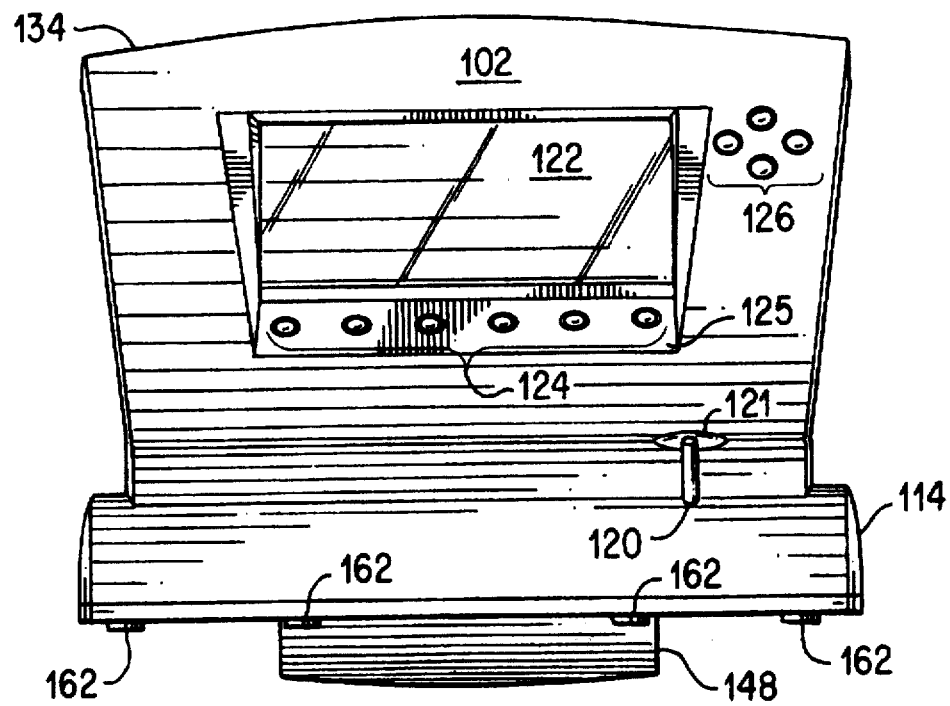
FIG. 24 is a front view of the computer of FIG. 19.
Figure 25:
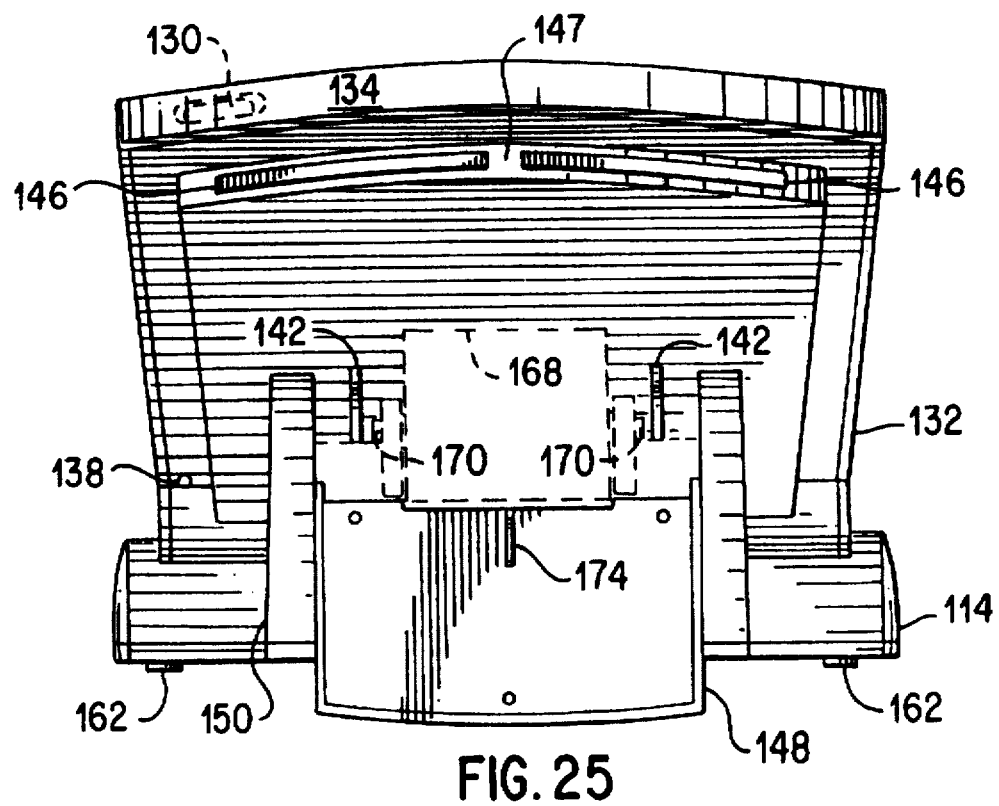
FIG. 25 is a rear view of the computer of FIG. 19.
Figure 26:
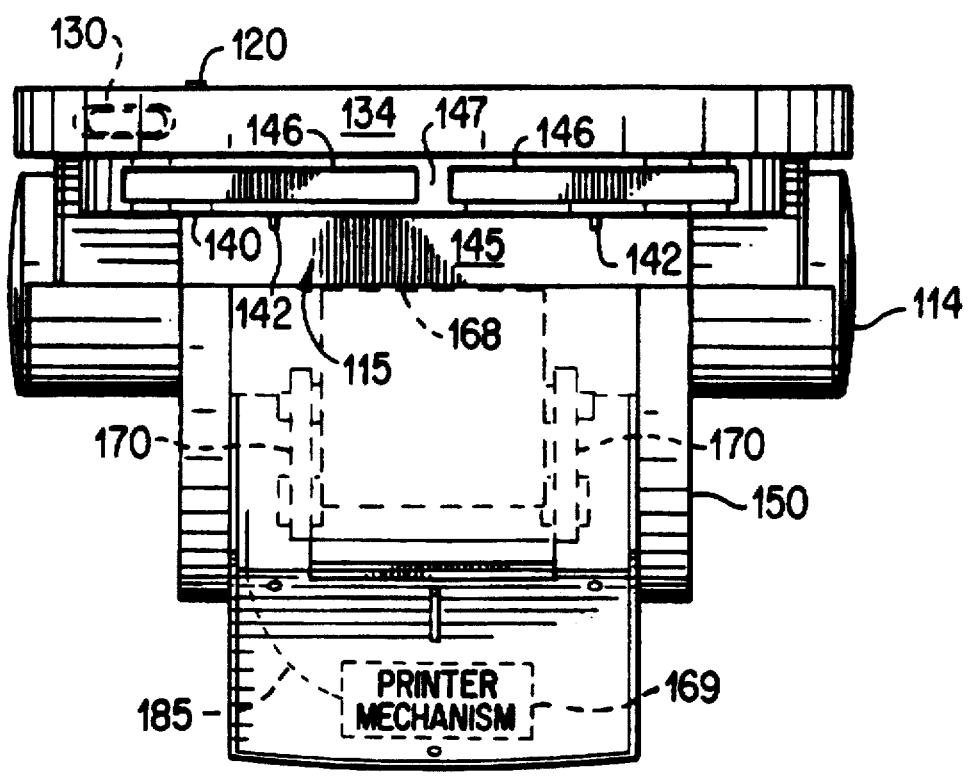
FIG. 26 is a view of the computer of FIG. 19 along a direction 26 as shown in FIG. 20.

As shown in FIG. 19, a bottom surface 106 of the housing 110 can include a cover 160 for a battery compartment. The cover 160 fits flush with the adjacent portions of the bottom surface 106 and is secured in place by biased retaining portions (not shown), as known in the art. A number of rubber feet 162 and 164 are attached to the bottom surface 106 of the housing 110 and a bottom surface of the keyboard 112, respectively, at two or more corners. The rubber feet 162 and 164 support the housing 110 and the keyboard 112 and to hold them in place on smooth surfaces.

Figure 9:
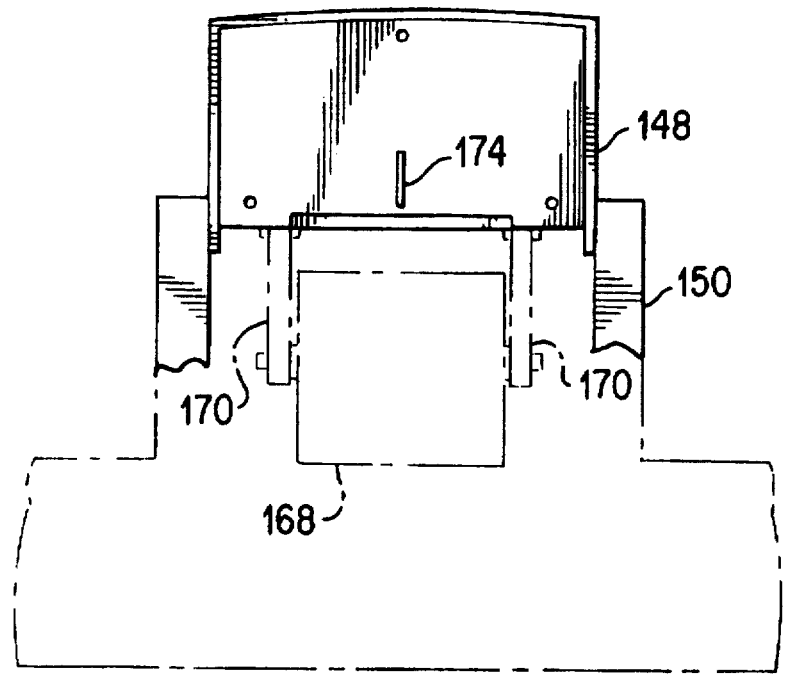
FIG. 9 is a view of the computer of FIG. 1 along a line 9—9 shown in FIG. 3.
Figure 10:
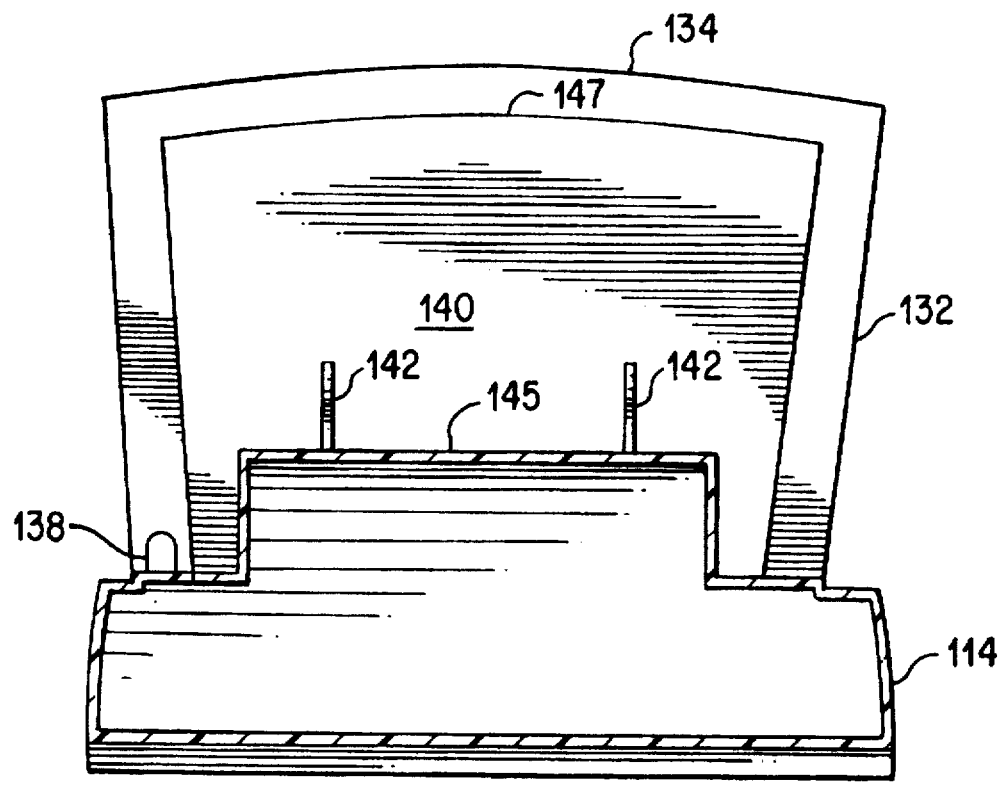
FIG. 10 is a view of the computer of FIG. 1 along a line 10—10 shown in FIG. 3.
Figure 11:
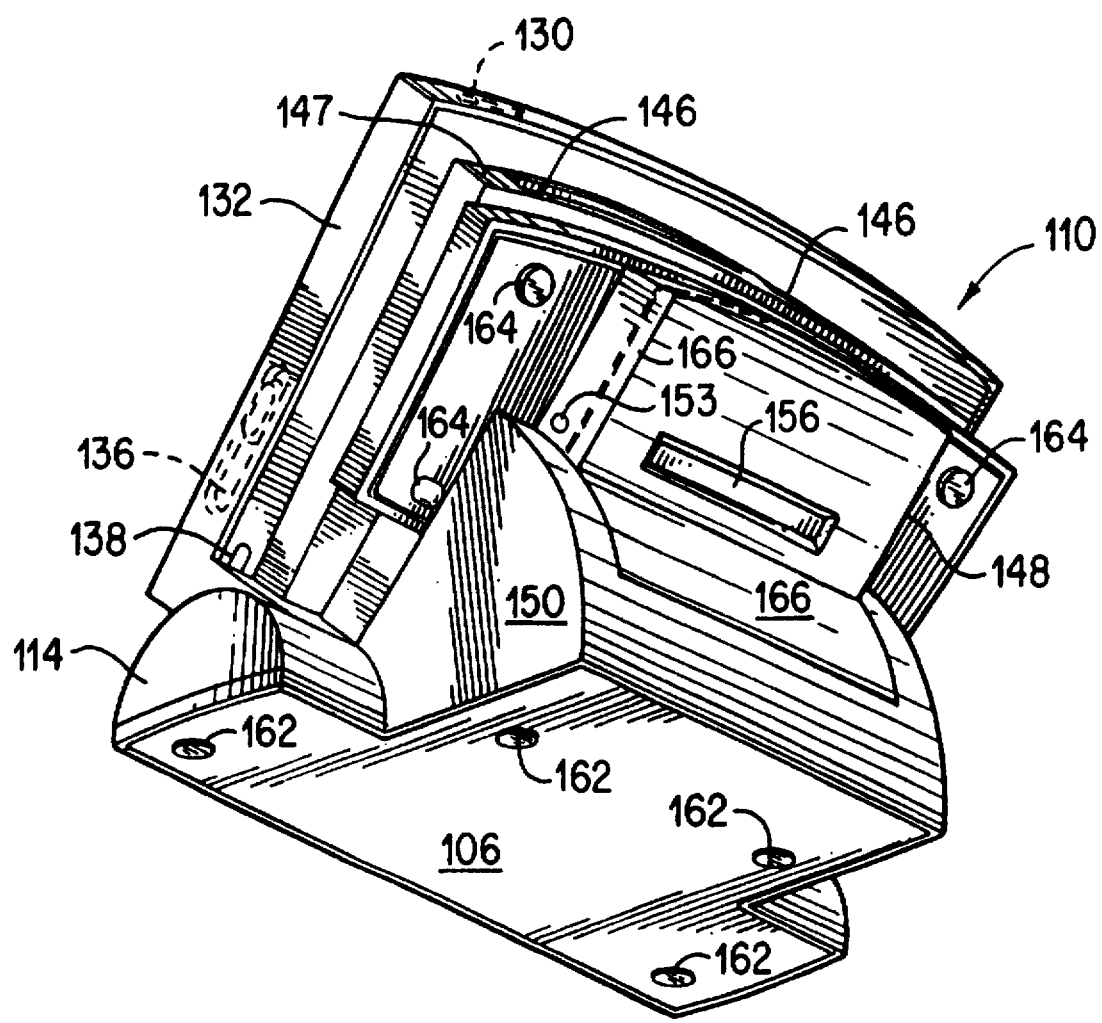
FIG. 11 is a rear perspective view of the computer with the keyboard in a storage position.
Figure 12:
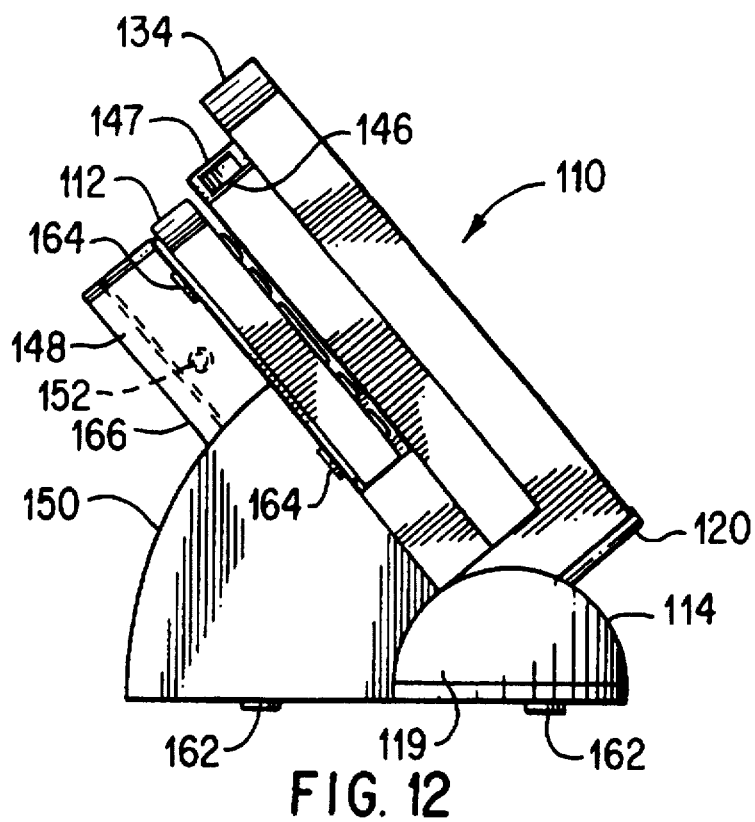
FIG. 12 is a left side view of the computer and keyboard of FIG. 11.
Figure 13:
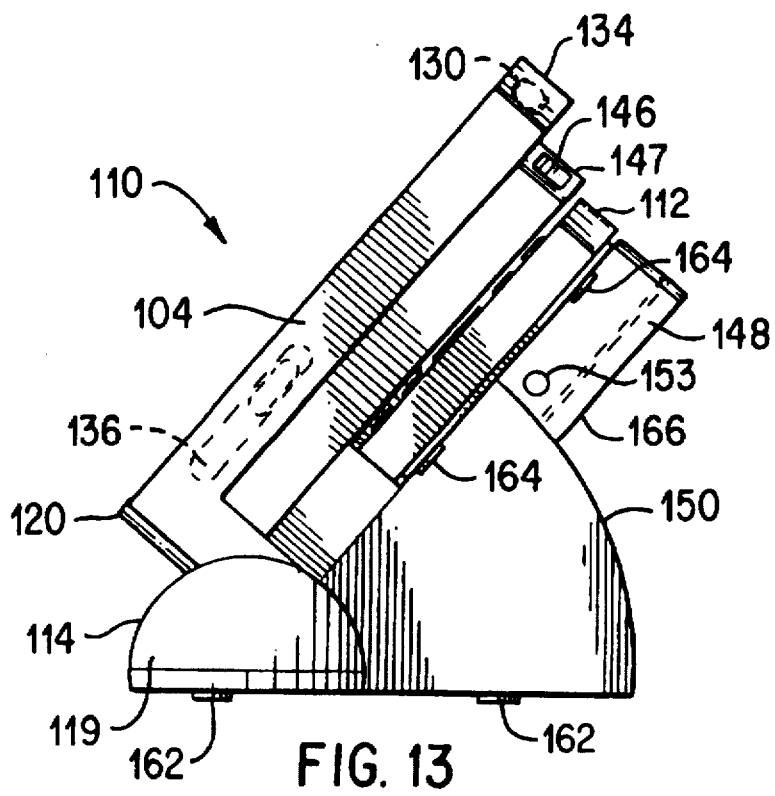
FIG. 13 is a right side view of the computer and keyboard of FIG. 11.
Figure 15:
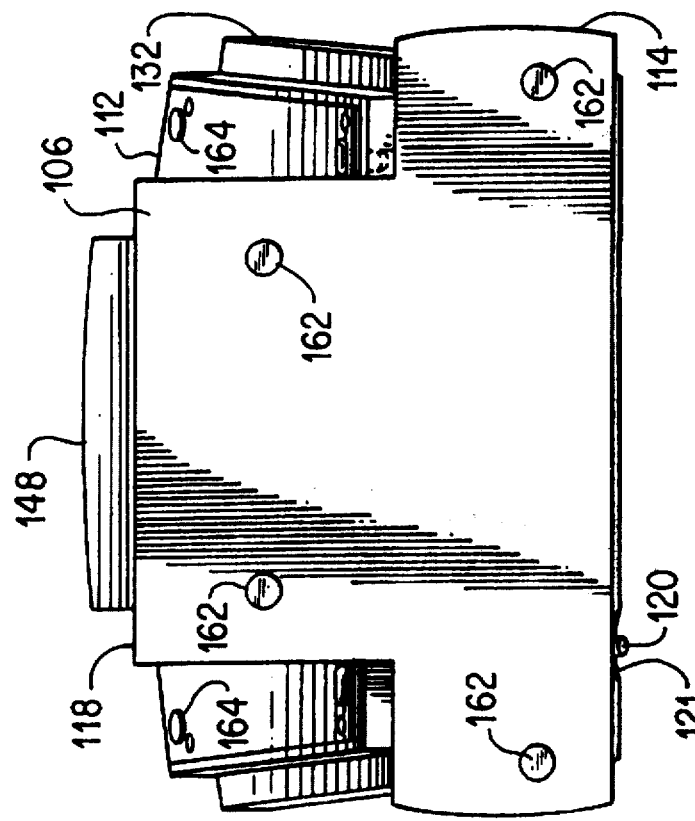
FIG. 15 is a bottom view of the computer and keyboard of FIG. 11.
Figure 14:
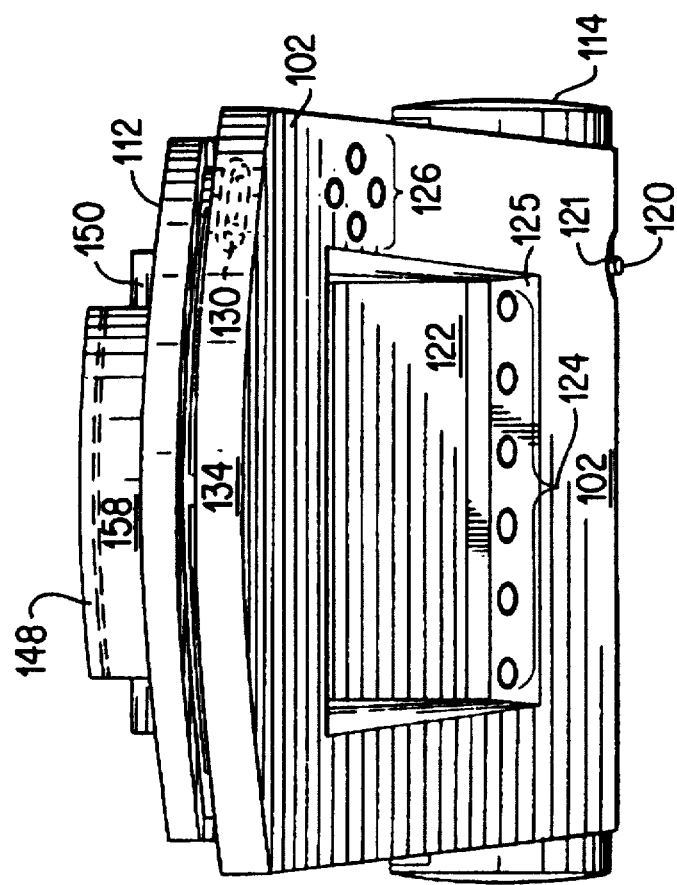
FIG. 14 is a top view of the computer and keyboard of FIG. 11.
Figure 16:
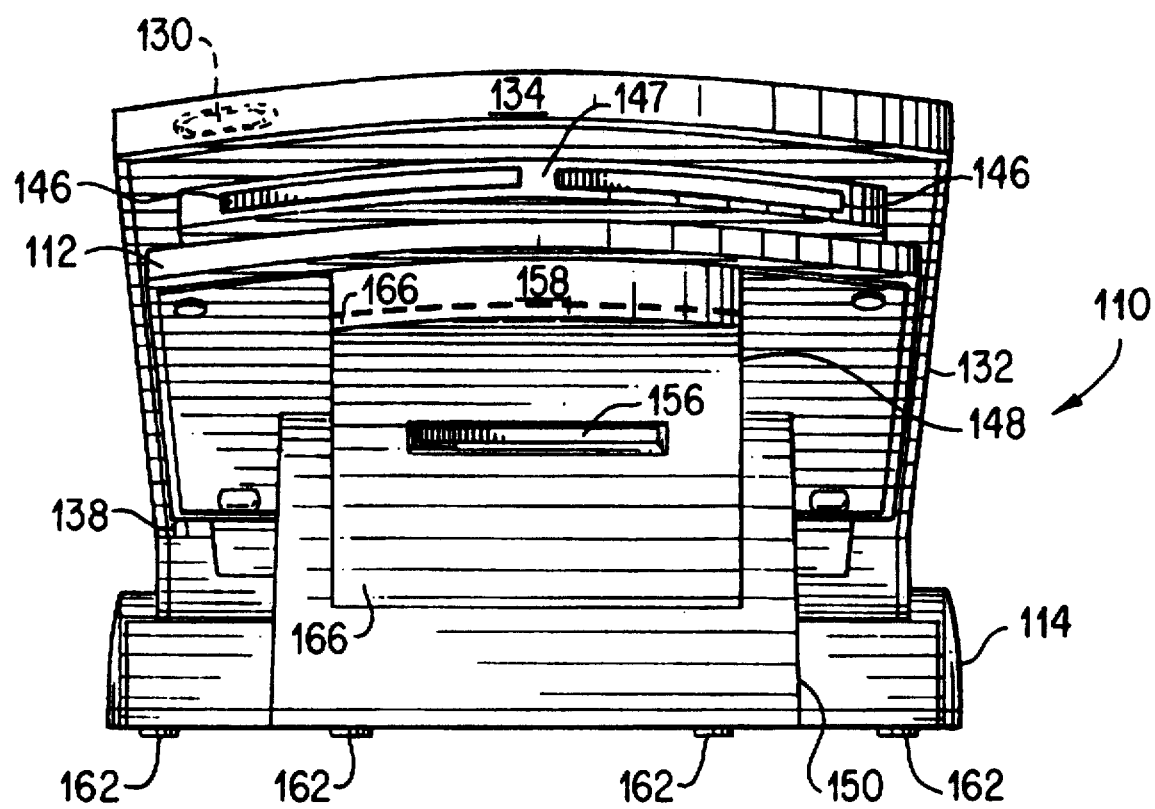
FIG. 16 is a rear view of the computer and keyboard of FIG. 11.

As shown in FIG. 6, the keyboard 112 includes a keyboard guide groove 176 extending inwardly from a rear surface of the keyboard 112. As shown in FIGS. 11-16, the housing 110 is configured to receive the keyboard 112, when placed into a keyboard storage position, within a keyboard storage portion 115 defined by the display screen portion rear surface 140, a printer front surface 144 and an adjoining surface 145 that connects the rear surface 140 of the display screen portion 132 to the front surface 144 of the printer 118. According to a preferred embodiment, the keyboard storage portion 115 is configured to receive the keyboard 112 such that the rear surface of the keyboard 112 rests against the adjoining surface 145, the top surface of the keyboard 112 is adjacent the rear surface 140, and the bottom surface of the keyboard 112 is adjacent the front surface 144 of the printer 118. The keyboard guide groove 176 on the bottom surface of the keyboard 112 is dimensioned to receive a keyboard guide member 174, as shown in FIGS. 3, 4 and 9, attached to the front surface 144 of the printer 118.

At least two webs 142 project from the rear surface 140. The webs 142 are dimensioned to engage the front surface of the keyboard 112 (preferably between adjacent keys) such that the keyboard 112 is securely yet removably held within the keyboard storage portion 115. Therefore, the keyboard 112 is restrained from moving in a longitudinal direction of the keyboard storage portion 115 when the keyboard groove 176 engages the keyboard guide member 174. Further, the keyboard 112 is restrained from moving in a lateral direction by when the keyboard 112 engages the webs 142, as well as when the bottom surface of the keyboard 112 engages the front surface 144 of the printer 118.

The keyboard 112 can be placed in the keyboard storage portion 115 to free the work space in front of the housing 110, to protect the keyboard 112 from environmental conditions, for example, food spatters and the like if the computer 100 is used in the kitchen, and to facilitate storage and transport of the computer 100. Because the width of the keyboard 112 is less than the width of the display screen portion 132, the keyboard 112, when it is in the keyboard storage position, is concealed when the computer 100 is viewed from the front.

As described above, because the display screen function keys 124 and the display screen cursor movement keys 126 remain accessible to the user when the keyboard 112 is in the keyboard storage position, the user maintains control over most operations of the computer 100, particularly during execution of menu-driven programs requiring input only through the function key 124 or 128 or the cursor movement keys 126. Furthermore, the keyboard 112, when it is stored in the keyboard storage position, does not interfere with inserting or removing the data storage elements 116 from the data storage element ports 146 or the operation of the printer 118.

FIGS. 19-26 illustrate the upper printing portion 148 pivoted downward from the operating position shown, for example, in FIG. 3, to the loading/unloading position. The upper printing portion is held in the operating position until an upper printer portion release button 152 is depressed. The loading/unloading position allows the user to access a paper roll 168 and other components of the printer 118.

The upper printer portion 148 includes a known printer mechanism 169, preferably a Seiko Epson MTP Series thermal printing mechanism, although other printing mechanisms can be used. As shown in FIG. 27, the printer mechanism 169 is electrically connected to the controller 210 through a flexible connection link 185 and the bus 230. The controller 210 converts text data to bit map data for output to the printer 118. In addition to printing an entire file when the print control button 120 is pressed as described above, the printer 118 responds to other system (i.e., print screen) and software print commands, as is known.

During operation of the printer 118, the paper roll 168 rotates on paper roll supports 170 as the paper is drawn into the printer mechanism and fed outward through a paper exit opening 156, as shown in FIG. 7, in a rear printer panel 166. The paper exit opening 156 preferably includes a serrated edge to facilitate tearing a desired portion of printed paper from the paper roll 168. The rear printer panel 166 is removable and preferably formed of transparent plastic. The compact configuration and rearwardly oriented paper exit opening 156 of the printer 118 maintain the streamlined overall appearance of the computer 100. In addition, because printed paper exists rearward, it is protected from environmental conditions, such as food spatters when the computer 100 is used in a kitchen.

Although this invention is described in conjunction with specific embodiments thereof, many alternatives, modifications and variations will be apparent to those skilled in the art. Accordingly, the preferred embodiments of the invention as set forth above are intended to be illustrative, not limiting. Various changes to the invention may be made without departing from its true spirit and scope as defined in the following claims.

What is claimed is:

1. An information device comprising:

a display screen portion in which a display screen is positionable;

a removably linked keyboard having a first set of function keys; and a second set of function keys positioned in the display screen portion, wherein a same function is assigned to corresponding ones of the first set of function keys and the second set of function keys, wherein shapes of keys in the second set of function keys correspond to shapes of keys in the first set of function keys.

2. The information device of claim 1, wherein a number of function keys in the second set corresponds to a number of function keys in the first set.

3. The information device of claim 1, wherein the keys in the second set of function keys and the keys in the first set of function keys are operator selectable.

4. The information device of claim 1, wherein the keys of the first and second sets of function keys have a substantially identical shapes.

5. The information device of claim 1, wherein the keys of the first and second sets of function keys have substantially identical sizes.

6. The information device of claim 1, wherein at least one pair of adjacent keys of the first set of function keys are separated by a first distance, and at least one pair of adjacent keys of the second set of function keys are separated by a second distance, the second distance being substantially equal to the first distance.

7. The information device of claim 1, wherein each pair of adjacent keys of the first and second sets of function keys are separated by substantially the same distance.

8. The information device of claim 1, wherein the keys of the first and second sets of function keys are arranged in substantially horizontal arrays.

9. The information device of claim 1, wherein the display screen is positionable within an area defining a display screen frame and the second set of function keys are positioned in a substantially horizontal array adjacent the display screen frame.

10. The information device of claim 9, wherein the second set of keys is positioned below the display screen frame in the substantially horizontal array.

11. The information device of claim 1, wherein the functions assigned to corresponding ones of the first and second sets of function keys are changeable during execution of a program by the information device.

12. An information device comprising:

a display screen portion in which a display screen is positionable;

a removably linked keyboard having a first set of function keys; and a second set of function keys positioned in the display screen portion, wherein a same function is assigned to corresponding ones of the first set of function keys and the second set of function keys, wherein a number of function keys in the second set corresponds to a number of function keys in the first set.

13. An information device comprising:

a display screen portion in which a display screen is positionable;

a removably linked keyboard having a first set of function keys; and a second set of function keys positioned in the display screen portion, wherein a same function is assigned to corresponding ones of the first set of function keys and the second set of function keys, wherein the keys of the first and second sets of function keys have substantially identical sizes.

* * * * *